United States Patent [19]
Cornelissen

[11] 3,884,815
[45] May 20, 1975

[54] OIL INTERCEPTORS FOR SEPARATING OIL FROM WATER BY GRAVITY

[75] Inventor: Jan Cornelissen, The Hague, Netherlands

[73] Assignee: Shell Oil Company, Houston, Tex.

[22] Filed: Oct. 26, 1973

[21] Appl. No.: 410,279

[30] Foreign Application Priority Data
Oct. 27, 1972  United Kingdom............ 49593/72
July, 1973  United Kingdom............ 34471/73

[52] U.S. Cl.............................. 210/521; 210/532
[51] Int. Cl............................................ B01d 21/00
[58] Field of Search............ 210/83, 220, 513, 521, 210/522, 532, 242, DIG. 21

[56] References Cited
UNITED STATES PATENTS
| | | | |
|---|---|---|---|
| 1,864,511 | 6/1932 | Jones............................ | 210/83 X |
| 2,782,929 | 2/1957 | Colher......................... | 210/532 R |
| 3,346,122 | 10/1967 | Cornelissen................ | 210/532 R X |
| 3,669,271 | 6/1972 | McGiven..................... | 210/242 |
| 3,700,107 | 10/1972 | Haviani....................... | 210/242 |
| 3,752,317 | 8/1973 | Lithen......................... | 210/242 |
| 3,768,648 | 10/1973 | Anderson et al.......... | 210/83 |
| 3,782,557 | 1/1974 | Pielkenroad................ | 210/521 |

*Primary Examiner*—Theodore A. Granger

[57] ABSTRACT

An oil interceptor or separator vessel for use on board ship, having an outlet oil line with an outlet oil weir therein and an outlet water line with an outlet water weir therein, and wherein the weirs are mounted adjacent one another and at a position above the main part of the separator vessel, the edge of the oil weir being at a higher level than the edge of the water weir. When the separator vessel is mounted on board a ship, at least the weirs are oriented whereby the edges of the weirs lie in substantially a port-starboard direction.

7 Claims, 10 Drawing Figures

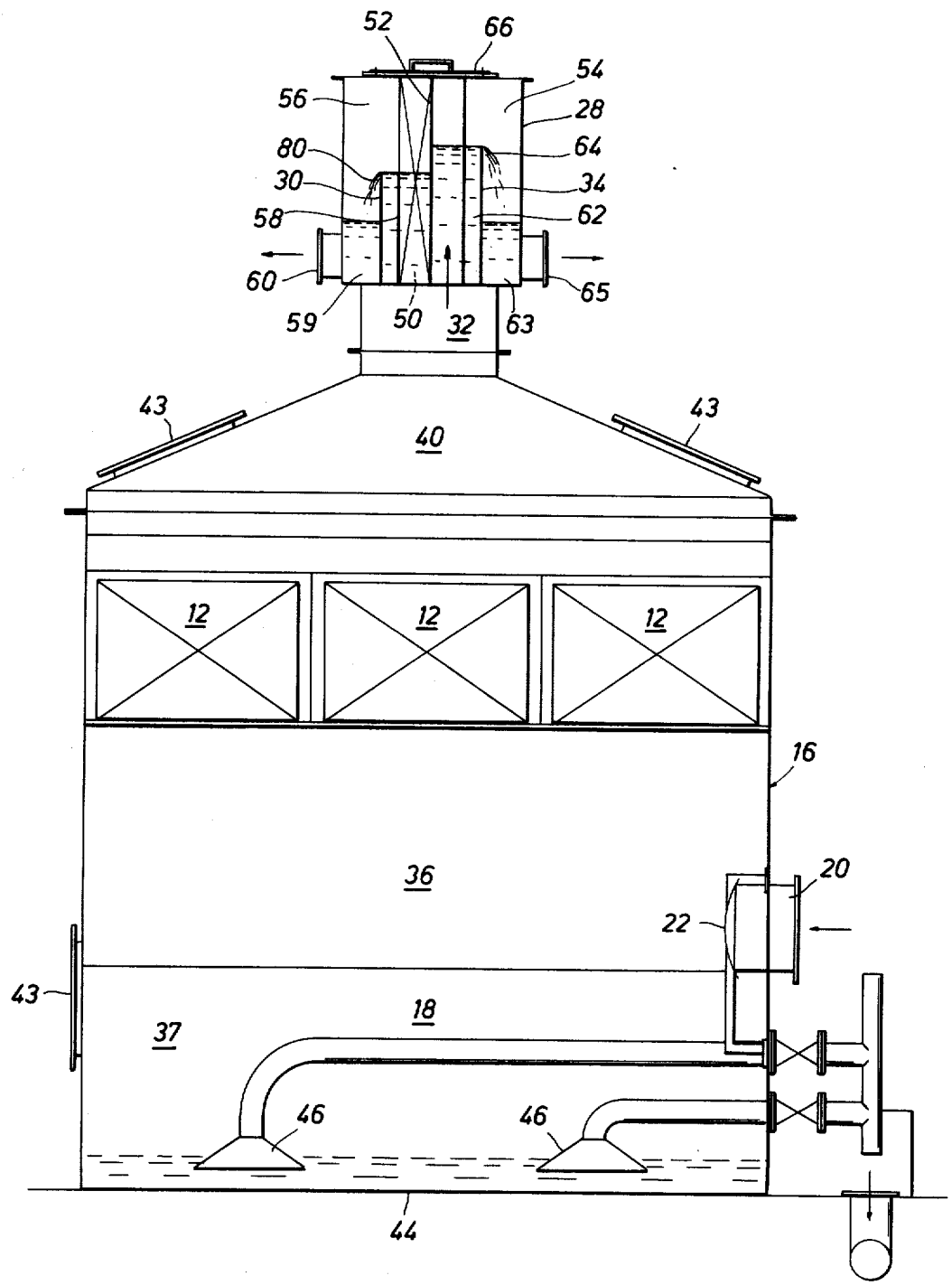

OIL INTERCEPTORS FOR SEPARATING OIL FROM WATER BY GRAVITY

BACKGROUND OF THE INVENTION

The invention relates to an oil interceptor or separator for separating oil from water by gravity. The invention is concerned with an oil interceptor of the type wherein the oil-water mixture flows into an interceptor vessel and the lighter-than-water oil globules rise on top of the water.

In particular the invention is concerned with an oil interceptor of the type which employs one or more packs of closely-spaced inclined plates between which an oil-water mixture is passed. In this type of interceptor, as the oil-water mixture flows downwardly between the plates under laminar flow conditions, the lighter-than-water oil globules rise and collect under the under surface of each plate and the heavier sludge and sediment settle out or the upper surface of each plate. The oil globules coalesce and rise free of the plate pack and the sludge settles to the bottom of the interceptor vessel containing the plate pack. An interceptor or separator of this type is shown in the U. S. Pat. No. 3,346,122.

It is now sought to apply this type of oil separation, which has found widespread acceptance in industrial waste water treatment, to marine use, especially for cleaning ballast and tank-cleaning water of tankers.

SUMMARY OF THE INVENTION

It is the main object of the invention to adapt an interceptor of the above type for use on board ship where it must be capable of functioning correctly in spite of the motion of the ship.

This is achieved in accordance with the invention by an oil interceptor of the type described comprising a closed interceptor vessel having an oil/water inlet, separate oil outlet and water outlet weirs connected respectively to an oil outlet and a water outlet of the interceptor vessel, wherein the oil outlet weir and the water outlet weir are mounted closely adjacent to one another and at a position above the main part of the interceptor vessel, the edge of the oil weir being at a higher level than the edge of the water weir.

Locating the outlet weirs above the main part of the interceptor vessel enables the two weirs to be mounted closely adjacent to one another and with their edges in the port-starboard direction of the ship, so that the pitching of the ship causes the minimum of disturbance to the automatic skimming of the oil. An additional advantage of this arrangement is that the weirs aae readily accessible.

One particular attraction of this type of oil interceptor is that the oil is removed automatically; that is to say, by arranging the water and oil skimming weirs at the appropriate heights the water level does not reach the level of the oil weir, whereas, as soon as a column of oil has accumulated in the duct leading to the oil weir, the lower density of the oil causes the oil level to rise until it overflows over the weir. Provided that the interceptor is always started full of water and that when nearly pure oil is pumped into the interceptor the rate of pumpimg is reduced from the maximum, it is almost impossible to remove water from the oil outlet and vice-versa. Adjustment of the respective weir heights may be necessary in the case when a crude of a significantly different density from the usual is to be separated.

The isolation of the weirs enables the closed vessel to be completely filled with liquid which prevents sloshing and surge in it due to the pitch and roll of the ship, which would otherwise reduce the effectiveness of the separation step.

In an attractive embodiment of the invention the oil and the water weirs are arranged in an overflow container, a dividing wall dividing the over flow container respectively into an oil overflow compartment and a water overflow compartment.

In order to reduce as much as possible the influence of the folling of the ship on the operation of the overflow device the edges of the oil weir and of the water weir are preferably of such a shape that all the points of the edge of the oil weir are always just above the maximum water level above the edge of the water weir at any rolling angle of the ship and under all operating conditions of the interceptor, for example by making the edge of the oil weir substantially concave and by making the edge of the water weir straight, or for example by making the edge of the oil weir straight and by making the edge of the water weir substantially convex. The advantage of these embodiments is that automatic skimming of the oil can be obtained at more or less the same oil layer thickness at any rolling angle of the ship.

Whilst the invention can be used in conjunction with other types of oil-water separators to provide automatic overflow of oil and water by gravity, for convenience the invention will be described with reference to the oil interceptor of the type employing one or more packs of closely spaced plates which are arranged to line in an inclined plane so that the oil-water mixture flows in a generally downward direction along the plates. The separation takes place under predominantly laminar flow conditions so that the oil droplets collect on the undersides of the plates, and rise to the surface as soon as they have become large enough. The plates may conveniently be corrugated in the direction of flow to assist the separation.

DESCRIPTION OF THE DRAWING

The invention will now be further described by way of example with reference to the accompanying drawings, in which:

FIG. 2 is a sectional side elevation of the six plate pack version of the interceptor of FIG. 1;

DESCRIPTION OF A PREFERRED EMBODIMENT

Figure 1:
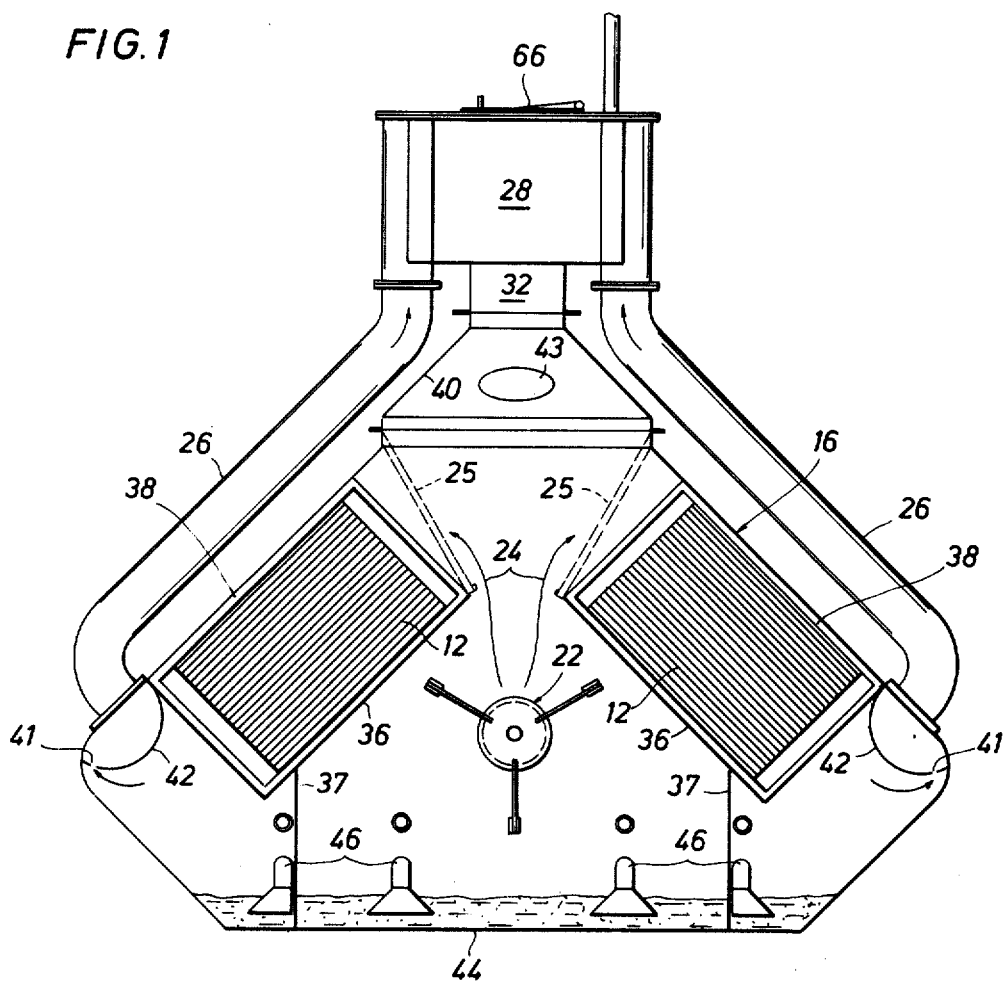
FIG. 1 is a sectional and elevation of an oil interceptor in accordance with the invention.
Figure 4:
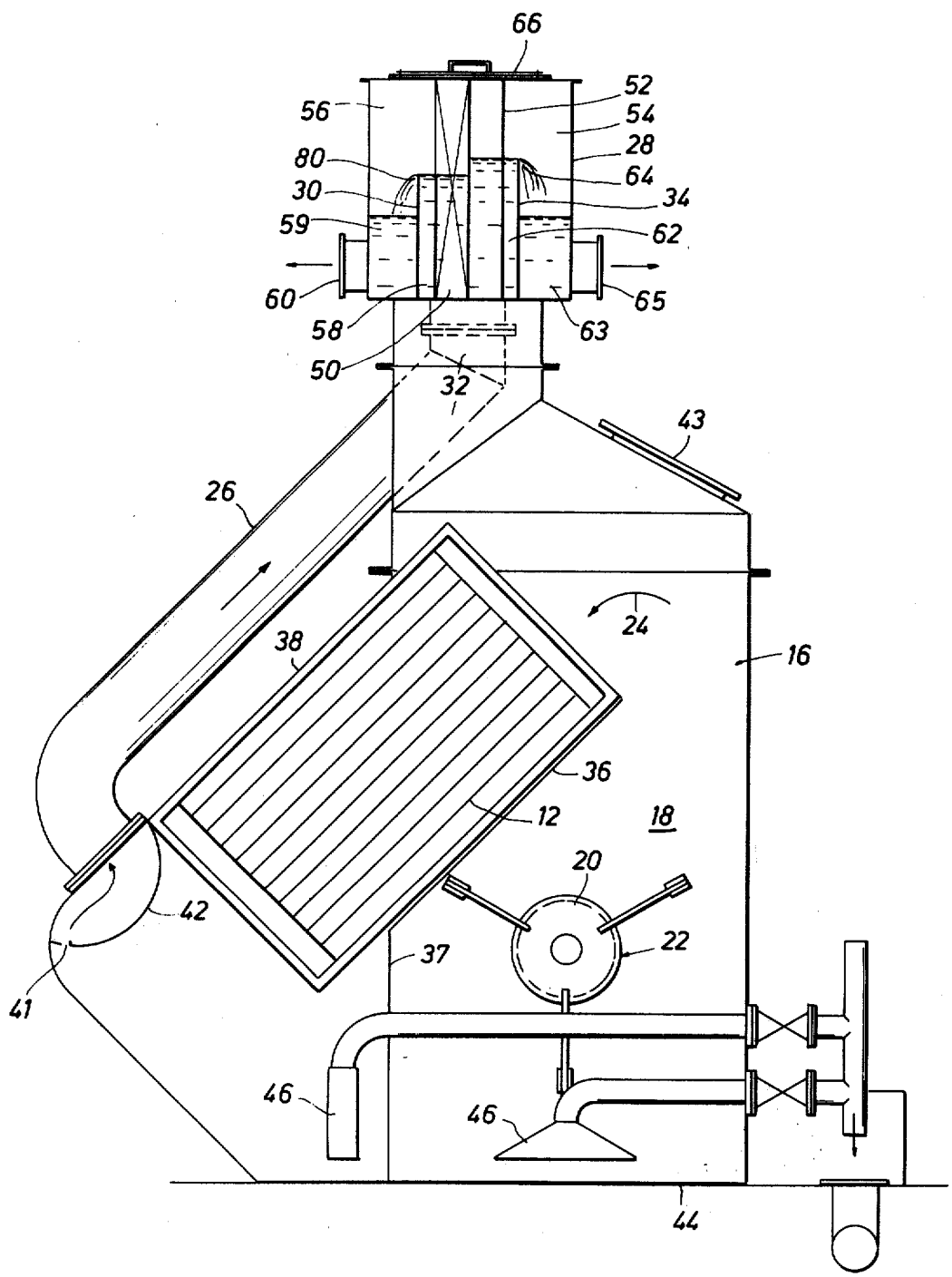
FIG. 4 is a sectional end elevation of an alternative embodiment of an oil interceptor in accordance with the invention.
Figure 5:
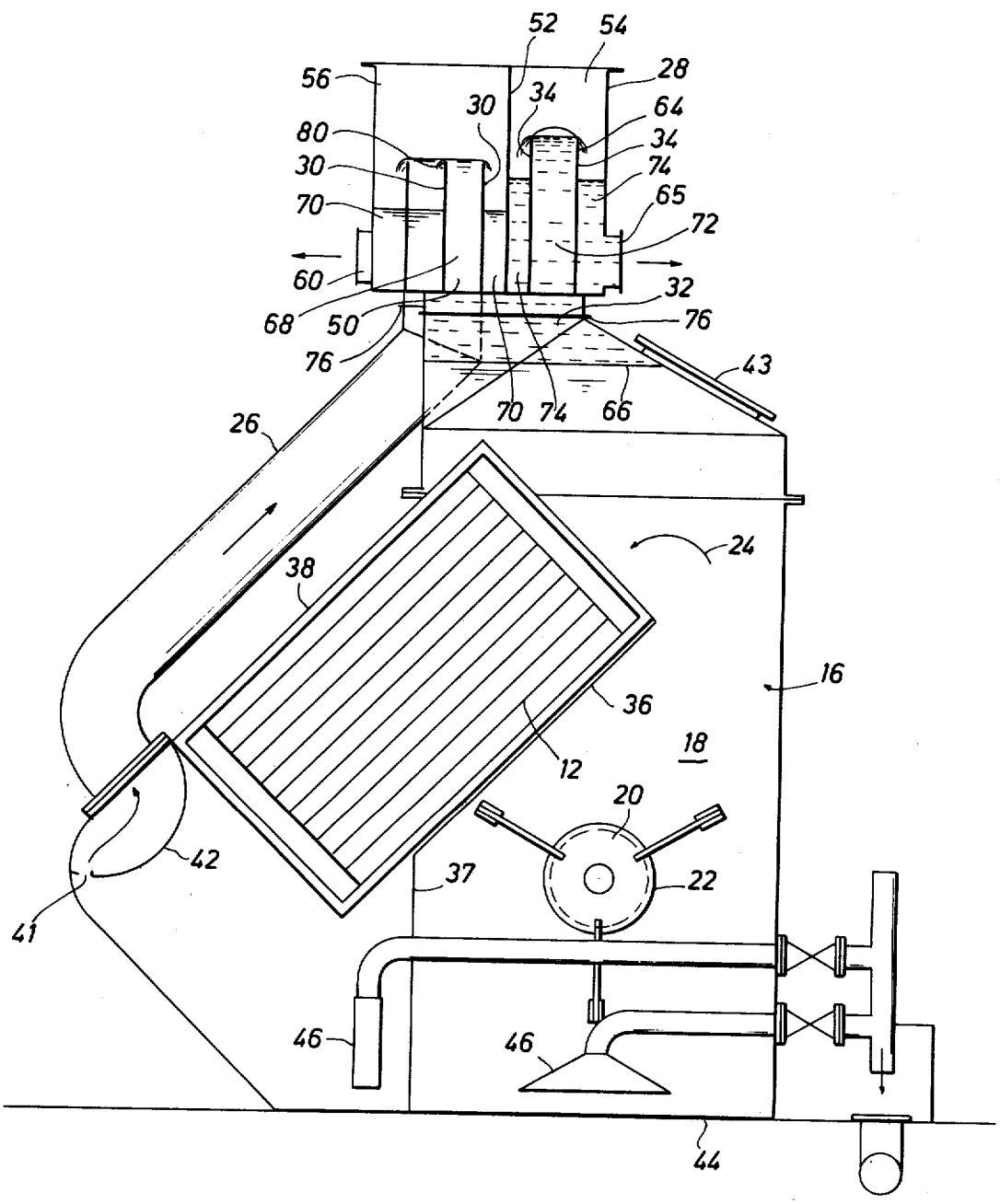
FIG. 5 is a sectional side elevation of an interceptor of the type described incorporating an alternative embodiment of an overflow device in accordance with the invention.

The interceptor or separator comprises one or more rows of plate packs 12 mounted in a vessel 16 of a strong construction, for example made of steel. The oil interceptor as shown in FIGS. 1 and 2 comprises two rows of plate packs 12, whereas the oil interceptors as shown in FIGS. 4 and 5 comprise only a single row of plate packs 12. The plate packs 12 are also known as parallel plate assemblies which are described in U.S Pat. No. 3,346,122.

Oily water enters an inlet chamber 18 via an inlet 20 fitted with a flow distributor 22; it then flows in the direction of arrows 24 to enter the upper ends of the plate packs 12. In the embodiment according to FIG. 1 flow distribution baffles 25 are present above the upper ends of the plate packs 12. After flowing downwardly through the plate packs 12 the cleaned water leaves the vessel 16 and passes through pipes 26 to an overflow device or box 28 containing a water overflow weir 30. The separated oil rises to the top of the vessel 16, rises through a duct 32 to an oil overflow weir 34 in the overflow box 28.

Turning in more detail to the construction, the vessel 16 comprises a voluminous inlet chamber 18 which provides the oil water with a short residence time for sludge to settle, and enhances the flow distribution across the whole length of the plate packs 12.

A slanting upper wall 36 of the inlet chamber 18 provides a support for the plate packs 12. The upper wall 36 is connected to a vertical dividing wall 37 to prevent any short circuiting of the flow from the inlet to the outlet. The plate packs 12 which are preferably of the type described in U.S. Pat. No. 3,346,122, should be corrosion-resistant to sea water, for example, being made entirely of fibre-reinforced resin. The plates should, preferably, be spaced at 2 cm intervals and there may be gutters fitted at either end to prevent separated oil and sludge respectively from becoming reentrained in the flow.

In order the facilitate maintenance the plate packs 12 are a sliding fit between the wall 36 and a slanting outer wall 38 of the vessel 16. Removal of the plate packs 12 is achieved by removing a lid 40 of the vessel 16 and sliding the plate packs 12 out through the opening. In position the plate packs 12 rest against the curved outlet baffles 42. Generally speaking, however, the plate packs 12 can be cleaned satisfactorily by passing water through the interceptor. Where exceptionally waxy oils have been separated, it will be advantageous to use hot water or to heat the water in the interceptor by lowering a hot water coil into the separation through the oil overflow duct 32.

In order to make the best use of the plate packs 12 it is important that the flow distribution across the cross section of the plate packs 12 should be uniform as possible. This requires careful design not only of the inlet flow path but also of that at the outlet. This is achieved by a curved outlet baffle 42 which is provided with a slit 41 extending along its entire length. The position of the slit 41 results in a minimum of sludge being carried into the pipe 26. Although only one baffle 42 is shown it is contemplated that where necessary additional baffles can be provided if required.

The dimensions of the interceptor can be varied to accommodate the required number of plate packs 12 for the quantity of water to be treated, or the quality of the water required at the outlet.

The sludge which settles out on the bottom 44 of the vessel 16 can be drained through a number of spaced bottom drains 46. For general overhauls and repair, various inspection hatches and doors 43 are provided in the walls of the vessel 16.

The construction of the overflow device or box 28 is important for it is this which leads to the relative immunity of the interceptor to the pitch and roll of the ship. The weirs 30, 34 should extend in a portstarboard direction and should be spaced apart by as small a gap as the flow rates allow. The height of the overflow box 28 above the oil-water interface in the interceptor will determine the height difference between the weirs 30, 34.

In all the embodiments of the overflow device the overflow box 28 comprises a dividing wall 52 which divides the box 28 in an oil compartment 54 and a water compartment 56.

Figure 3:
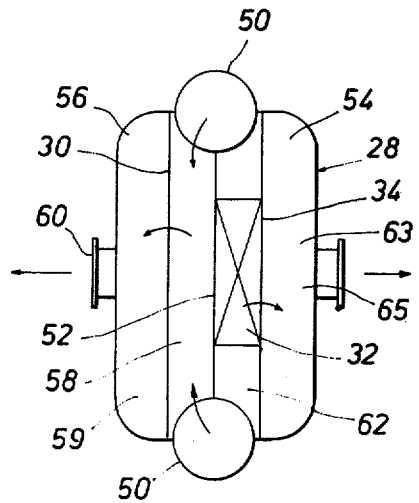
FIG. 3 is a plan view of the overflow device placed above the main vessel of the interceptor.

In the embodiment as shown in FIGS. 2, 3 and 4 a trough 58 is formed between the dividing wall 52 and the water weir 30. At opposite ends of the trough 58 water inlets 50 are present. Water from the inlets 50 flows into the trough 58 whence the overflow spills into a second trough 59 connected with a water outlet 60. The oil from the interceptor rises to the top of the vessel 16 and then passes through the duct 32 into a trough 62 between the dividing wall 52 and the oil weir 34. The overflow over the oil weir 34 spills into a second trough 63 leading to an oil outlet 65. A removable lid 66 is provided to enable inspection and maintenance.

Figure 6:
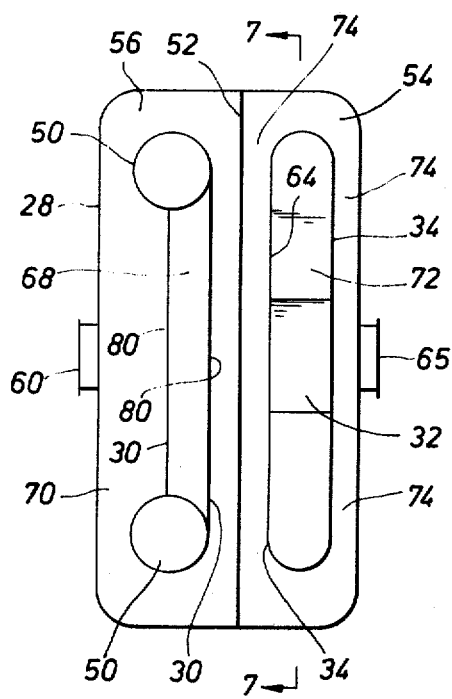
FIG. 6 is a plan view of the overflow device according to FIG. 5.

In the embodiment of the overflow device as shown in FIGS. 5 and 6 the water overflow weir 30 encloses a trough 68. At opposite ends of the trough 68 water inlets 50 are present. Water from the inlets 50 flows into the trough 68 formed by the weir 30, whence the overflow spills into a space 70 connected with a water outlet 60. The oil from the interceptor rises to the top of the vessel 16 and then passes through the duct 32 into a trough 72 enclosed by the oil overflow weir 34. The overflow over the oil overflow weir 34 spills into a space 74 leading to an oil outlet 65. In order to provide automatic skimming of the oil, and only the oil, the level of the oil overflow weir 34 must be higher than the maximum water level at the water overflow weir 30.

Figure 7:
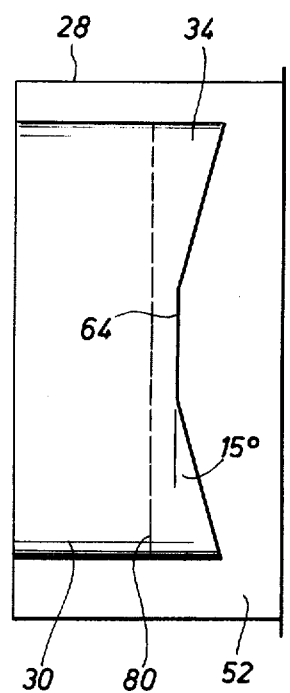
FIG. 7 is a sectional side elevation III-III through the oil overflow side of the overflow device according to FIG. 5.
Figure 8:
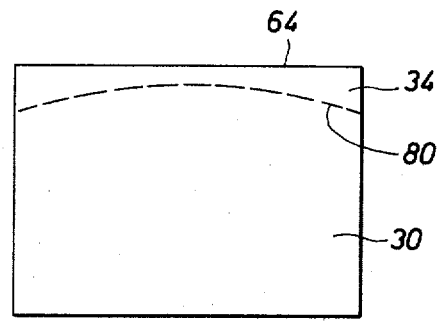
FIG. 8 shows schematically a modified embodiment of the overflow device.
Figure 9:
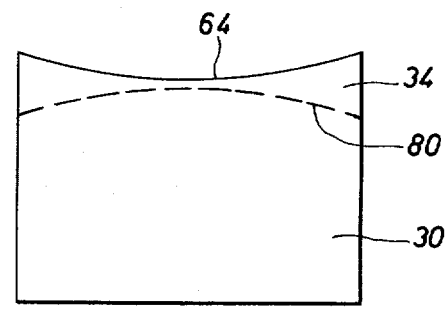
FIG. 9 shows schematically another modified embodiment of the overflow device.
Figure 10:
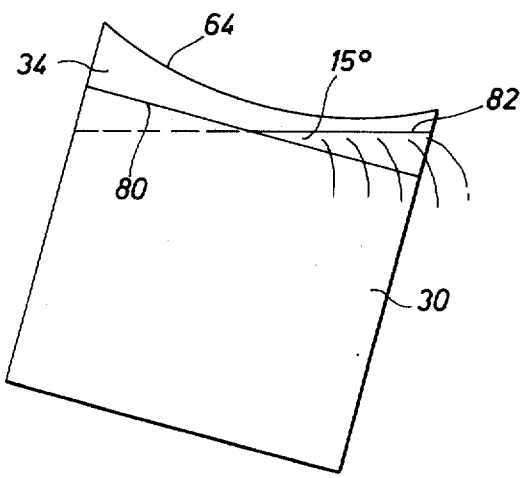
FIG. 10 shows schematically the embodiment according to FIG. 7 at the maximum rolling angle of the ship.

The edge 64 of the oil weir 34 and the edge 80 of the water weir 30 are preferably arranged and shaped in a special manner so as to reduce the influence of the rolling movement of the ship as much as possible. For this purpose when the overflow device is in a horizontal position, all the points of the edge 64 of the oil weir 34 are higher than all the points of the edge 80 of the water weir 30, and furthermore the edge 64 of the oil weir 34 and the edge 80 of the water weir 30 are of such a shape that all the points of the edge 64 of the oil weir 34 are always above the maximum water level above the edge 80 of the water weir 30 at any rolling angle of the ship and under all operating conditions of the interceptor. A preferred embodiment of the invention based on this principle is shown in FIG. 7. In this embodiment the edge 64 of the oil weir 34 is substantially concave and the edge 80 of the water weir 30 is substantially straight. In another suitable embodiment shown schematically in FIG. 8 the edge 64 of the oil weir 34 is substantially straight and the edge 80 of the water weir is substantially convex. In a third possible embodiment shown schematically in FIG. 9 the edge 64 of the oil weir 34 is substantially concave and the edge 80 of the water weir 30 is substantially convex. In FIG. 10 the operation of the device according to FIG. 7 is shown at the moment the ship has reached its maximum rolling angle, say 15°. The maximum water level above the water weir 30 being indicated by the reference numeral 82.

In the event that the relative desities of the oil and water change for any reason, extension pieces can be added to the duct 32 and to the pipe 26 at the flanges indicated at 76.

Whilst the cleaned water is pumped directly overboard, the oil and sludge are passed to a slop tank.

The application of the well-tried plate-pack oil-interceptors to marine oil separators enables tankers and the like to obtain consistently low oil concentrations in ballast water pumped overboard, significantly lower than using presently available separators. The actual efficiency of the separation depends largely upon the flow velocity through the separators.

It is contemplated that the interceptor can be used, albeit at below the maximum design flow rate, when a tanker is sailing under load to remove sea water from the bottom of the tanks. This will have the considerable advantage of simplifying the subsequent handling of the oil at the refinery.

The interceptor described above may also lend itself to industrial applications where separation has to be carried out under pressure. In this case a suitable head is provided by raising the overflow box 28 above the vessel as required. For marine use the design necessarily has as far as possible avoided sharp edges. Suitable corrosion-resistant protective coatings are also required inside and out.

I claim as my invention:

1. Oil interceptor for separating oil from water by gravity comprising a closed interceptor vessel having an oil/water inlet, an overflow container mounted above said interceptor vessel, said overflow container having a cross-sectional area less than one-half that of said interceptor vessel, a dividing wall mounted in the overflow container dividing the interior thereof into an oil overflow compartment and a water overflow compartment, each of said compartments having an fluid inlet port and a fluid outlet port, an oil conduit operatively connecting one side of the interceptor vessel with the inlet port of the oil overflow compartment of said overflow container, a water conduit operatively connecting the other side of said interceptor vessel with the inlet port of the water overflow compartment of said overflow container, separate oil outlet wnd water outlet weirs mounted in said oil and said water overflow compartments of said overflow container and being connected respectively in fluid communication to said oil outlet port and said water outlet port of the overflow container of said interceptor vessel, the oil outlet weir and the water outlet weir being mounted closely adjacent to one another and at a position above the interceptor vessel, the edge of the oil weir being at a higher level than the edge of the water weir, and at least one of the weirs being of a curved configuration at its upper edge between the ends thereof.

2. Oil interceptor as claimed in claim 1, wherein the edge of the oil weir is substantially concave and the edge of the water weir is straight.

3. Oil interceptor as claimed in claim 1, wherein the edge of the oil weir is straight and the edge of the water weir is substantially convex.

4. Oil interceptor as claimed in claim 1, wherein the edge of the oil weir is substantially concave and the edge of the water weir is substantially convex.

5. Oil interceptor as claimed in claim 1, wherein the oil interceptor is arranged on a ship in such a manner that the edges of the oil and water weirs extend in the port-starboard direction of the ship.

6. Oil interceptor as claimed in claim 1, wherein the oil interceptor is of the type which employs one or more packs of closelyspaced inclined plates.

7. Oil interceptor as claimed in claim 1, wherein the horizontal cross-sectional area of said interceptor is substantially greater than that of said overflow container.

* * * * *